United States Patent
Vermeire et al.

(10) Patent No.: US 6,931,623 B2
(45) Date of Patent: Aug. 16, 2005

(54) METHOD OF ACCESSING DATA AND LOGIC ON EXISTING SYSTEMS THROUGH DYNAMIC CONSTRUCTION OF SOFTWARE COMPONENTS

(75) Inventors: Dean R. Vermeire, Lenexa, KS (US); Gary L. Murphy, Olathe, KS (US)

(73) Assignee: Touchnet Information Systems, Inc., Lenexa, KS (US)

( * ) Notice: Subject to any disclaimer, the term of this patent is extended or adjusted under 35 U.S.C. 154(b) by 674 days.

(21) Appl. No.: 09/764,564

(22) Filed: Jan. 17, 2001

(65) Prior Publication Data

US 2001/0025372 A1 Sep. 27, 2001

Related U.S. Application Data

(63) Continuation-in-part of application No. 09/385,903, filed on Aug. 30, 1999, now Pat. No. 6,209,124.

(51) Int. Cl.$^7$ ................................................. G06F 9/44
(52) U.S. Cl. ........................ 717/108; 717/107; 717/114; 717/116
(58) Field of Search ................................. 717/106–108, 717/114, 116, 138, 170, 120–121, 136–140, 145–146; 719/328, 310; 715/500; 709/223; 712/220; 707/103 R

(56) References Cited

U.S. PATENT DOCUMENTS

| | | | |
|---|---|---|---|
| 5,499,371 A | * | 3/1996 | Henninger et al. ......... 717/108 |
| 5,794,247 A | | 8/1998 | Blackman et al. |
| 5,799,313 A | | 8/1998 | Blackman et al. |
| 5,809,508 A | * | 9/1998 | Blackman et al. ...... 707/103 R |
| 5,809,509 A | * | 9/1998 | Blackman et al. ...... 707/103 R |
| 5,835,910 A | | 11/1998 | Kavanagh et al. |
| 5,953,534 A | * | 9/1999 | Romer et al. ................ 717/138 |
| 5,956,725 A | | 9/1999 | Burroughs et al. |
| 5,956,730 A | | 9/1999 | Burroughs et al. |
| 5,974,256 A | | 10/1999 | Matthews et al. |
| 6,016,495 A | | 1/2000 | McKeehan et al. |
| 6,018,743 A | * | 1/2000 | Xu .......................... 707/103 R |
| 6,081,808 A | | 6/2000 | Blackman et al. |
| 6,125,442 A | * | 9/2000 | Maves et al. ................ 712/220 |
| 6,141,660 A | * | 10/2000 | Bach et al. .................. 717/108 |
| 6,209,124 B1 | * | 3/2001 | Vermeire et al. ........... 717/114 |
| 6,252,587 B1 | * | 6/2001 | Purple ......................... 717/109 |
| 6,442,749 B1 | * | 8/2002 | Hirao et al. ................ 717/170 |
| 6,473,768 B1 | * | 10/2002 | Srivastava et al. .......... 707/101 |
| 6,546,419 B1 | * | 4/2003 | Humpleman et al. ....... 709/223 |

FOREIGN PATENT DOCUMENTS

WO    WO0167290 A2  *  9/2001

OTHER PUBLICATIONS

Pang, Ringo; "Data Conversion form Object–Oriented to Relational database and its Verification by use of Information Capacity"; Department of Computer Science, City Univiersity of Hong Kong; pp. 1–4.*

* cited by examiner

Primary Examiner—Kakali Chaki
Assistant Examiner—William H. Wood
(74) Attorney, Agent, or Firm—Sonnenschein Nath & Rosenthal LLP; Bryan P. Stanley

(57) ABSTRACT

A record layout in a legacy application is defined by the record definition in the source code of the language in which the application was written. For each record in a legacy application, the layout of the record is saved in a language-neutral and architecture neutral format in preparation for a runtime invocation. During runtime, for each record, the legacy application can send architecture-specific binary information as it exists in memory on the legacy computer to a component runtime environment that will construct a compatible object-oriented instance of a class to manipulate the information. Once the information is manipulated, the updated information can be represented to the original legacy application in an architecture-specific binary record layout.

6 Claims, 23 Drawing Sheets

```
01  STUDENT-SUMMARY-INFORMATION.
    05   ID-NUMBER               PIC 9(6).
    05   PIN                     PIC 9(6).
    05   NAME                    PIC A(35).
    05   ADDRESS                 PIC A(25)
         OCCURS 3 TIMES.
    05   PHONE-NUMBER            PIC 999-999-9999.
    05   SOCIAL-SECURITY-NUMBER  PIC 999-99-9999.
    05   GRADE-POINT-AVERAGE     PIC 9V99.
    05   BALANCES.
         10  TUITION             PIC S9(5) COMP-3.
         10  HOUSING             PIC S9(5) COMP-3.
```

Fig. 3

```
<?xml version="1.0"?>
<!DOCTYPE record SYSTEM "/XML/Meta/tmeta.dtd">
<record name="STUDENT-SUMMARY-INFORMATION" architecture="s390" align="1">
   <field type="pic" align="1" spec="999999" size="6">
      <name>ID-NUMBER</name>
      <association>ID-NUMBER</association>
   </field>
   <field type="pic" align="1" spec="999999" size="6">
      <name>PIN</name>
      <association>PIN</association>
   </field>
   <field type="pic" align="1" spec="XXXXXXXXXXXXXXXXXXXXXXXXXXXXXXXXXXX" size="35">
      <name>NAME</name>
      <association>NAME</association>
   </field>
   <array size="3">
      <name>ADDRESS</name>
      <association>ADDRESS</association>
      <field type="pic" align="1" spec="XXXXXXXXXXXXXXXXXXXXXXXXX" size="25">
         <name>ADDRESS</name>
         <association>ADDRESS</association>
      </field>
   </array>
   <field type="pic" align="1" spec="999X999X9999" size="12">
      <name>PHONE-NUMBER</name>
      <association>PHONE-NUMBER</association>
   </field>
   <field type="pic" align="1" spec="999X99X9999" size="11">
      <name>SOCIAL-SECURITY-NUMBER</name>
      <association>SOCIAL-SECURITY-NUMBER</association>
   </field>
   <field type="pic" align="1" spec="999" shift="-2" size="3">
      <name>GRADE-POINT-AVERAGE</name>
      <association>GRADE-POINT-AVERAGE</association>
   </field>
   <struct>
      <name>BALANCES</name>
      <association>BALANCES</association>
      <field type="packed" align="1" size="3">
         <name>TUITION</name>
         <association>TUITION</association>
      </field>
      <field type="packed" align="1" size="3">
         <name>HOUSING</name>
         <association>HOUSING</association>
      </field>
   </struct>
</record>
```

Fig. 4A

```
package com.touchnet.beangen;

import com.touchnet.base.*;
import java.io.*;
import java.util.*;

/**
 * This will provide the functionality that is common to all generated JavaBeans that
 * map into legacy structures
 *
 * Creation date: (12/14/99 1:28:08 PM)
 * @author: Gary Murphy
 */
public abstract class AbstractStructure
    implements StructureInterface
{
    private String            architecture;
    private StructTreeNode    root    = null;
    private BinaryRenderingEngine engine = new BinaryRenderingEngine();
    private java.lang.String metadataName;
/**
 * Create the base constructure for Java objects that wrapper legacy data
 * structures
 */
public AbstractStructure()
    {
    super();
    }
/**
 * Access the name of the architecture that the underlying binary data
 * represents
 */
public String getArchitecture()
    throws TException
    {
    return architecture;
    }
/**
 * This will access an array within the structure. It will be returned as
 * an array of some concrete instance of this AbstractStructure. Even if
 * the array is of a single field, it will still be represented as a
 * structure that simply contains a single element. If the requested
 * element is not an array, this will throw an exception.
 */
public StructureInterface[] getArray(String name)
    throws TException
    {
    AbstractStructureTreeNode node = getNode(name);
    if (node instanceof ArrayTreeNode)
        {
        ArrayTreeNode arrayNode = (ArrayTreeNode)node;
        return arrayNode.getArray();
        }

// If this isn't an array node, then we tried to access a non-array
    // as an array throw new TException("Attempt to access a non-array element as an array");
    }
/**
 * Access the binary rendering engine.
 *
 * Creation date: (1/3/00 1:11:03 PM)
 * @return com.touchnet.base.BinaryRenderingEngine
 */
protected BinaryRenderingEngine getEngine()
    {
    if (null == engine)
        engine = new BinaryRenderingEngine();
    return engine;
    }
```

Fig. 4B

```
/**
 * Access the named field within the component
 */
public String getField(String name)
    throws TException
    {
    AbstractStructureTreeNode node = getNode(name);
    if (node instanceof FieldTreeNode)
        {
        FieldTreeNode fieldNode = (FieldTreeNode)node;
        return fieldNode.getField().toString();
        }

// It's not a field, so this is an exception throw new TException("Attempt to access a non-field element as a field");

}
/**
 * Access the name of the metadata that describes this component
 *
 * Creation date: (2/29/00 11:24:58 AM)
 * @return java.lang.String
 */
public String getMetadataName()
    {
    return metadataName;
    }
/**
 * This will access the named node, starting at the root of the embedded tree
 *
 * Creation date: (2/29/00 11:43:09 AM)
 * @return com.touchnet.beangen.AbstractStructureTreeNode
 * @param name java.lang.String
 * @exception com.touchnet.base.TException The exception description.
 */
protected AbstractStructureTreeNode getNode(String name)
    throws TException
    {
    StringTokenizer tokenizer = new StringTokenizer(name, "/");
    return getNode(tokenizer, getRoot());
    }
/**
 * This will access the named node, as a child of the current node.  The name
 * is the next element in the tokenizer.  If the name child doesn't exist, this
 * will throw an exception
 *
 * Creation date: (2/29/00 11:43:09 AM)
 * @return com.touchnet.beangen.AbstractStructureTreeNode
 * @param name java.lang.String
 * @exception com.touchnet.base.TException The exception description.
 */
protected AbstractStructureTreeNode
    getNode(StringTokenizer tokenizer, AbstractStructureTreeNode current)
    throws TException
    {
    if (!tokenizer.hasMoreElements())
        return current; // The current node is the requested node String child = tokenizer.nextToken();

// Look for the name among the child nodes int count = current.getChildCount();
    for (int i = 0; i < count; ++i)
        {
        AbstractStructureTreeNode node =
                        (AbstractStructureTreeNode)current.getChildAt(i);
        if (node.getName().equals(child))
            return getNode(tokenizer, node);
        }
```

Fig. 4C

```
    // The name didn't match any of the children throw new TException("The child of '"+current.getName()+"' named '"+
                         child+"' does not exist");
    }
/**
* This will access the root node for the legacy data layout
*
* Creation date: (1/3/00 12:56:48 PM)
* @return com.touchnet.beangen.StructTreeNode
*/
protected StructTreeNode getRoot()
    {
    return root;
    }
/**
* This will read the binary contents of the input stream and
* place it in the appropriate nodes of the tree
*/
public void read(InputStream stream)
    throws TException
    {
    // Code not shown
    }
/**
* Access the name of the architecture that describes the underlying
* binary data.
*/
public void setArchitecture(String name)
    throws TException
    {
    architecture = name;
    return;
    }
/**
* Set the array for this level in the data structure
*/
public void setArray(String name, StructureInterface[] child)
    throws TException
    {
    AbstractStructureTreeNode node = getNode(name);
    if (node instanceof ArrayTreeNode)
        {
        ArrayTreeNode arrayNode = (ArrayTreeNode)node;
        arrayNode.setArray(child);
        }

// If this isn't an array node, then we tried to access a non-array
    // as an array throw new TException("Attempt to access a non-array element as an array");
    }
/**
* Update the named field with the value
*/
public void setField(String name, String value)
    throws TException
    {
    AbstractStructureTreeNode node = getNode(name);
    if (node instanceof FieldTreeNode)
        {
        FieldTreeNode fieldNode = (FieldTreeNode)node;
        LegacyField field = fieldNode.getField();
        field.setValue(value);
        }

// It's not a field, so this is an exception throw new TException("Attempt to access a non-field element as a field");
```

Fig. 4D

```
    }
/**
 * Access the name of the metadata that describes this component
 *
 * Creation date: (2/29/00 11:24:58 AM)
 * @param name java.lang.String
 */
public void setMetadataName(String name)
    {
    metadataName = name;
    return;
    }
/**
 * This will access the root node for the legacy data layout
 *
 * Creation date: (1/3/00 12:56:48 PM)
 * @param rootNode com.touchnet.beangen.StructTreeNode
 */
protected void setRoot(StructTreeNode rootNode)
    {
    root = rootNode;
    return;
    }
/**
 * This will write the binary contents back to the
 */
public void write(OutputStream stream)
    throws TException
    {
    // Code not shown
    }
}
```

Fig. 5A

```
package com.touchnet.beangen.generated;

import com.touchnet.beangen.*;
import com.touchnet.base.*;
/**
 * This was automatically generated 2/29/00 12:38:47 PM
 */
public class StudentSummaryInformation
    extends AbstractStructure
{
/**
 * StudentSummaryInformation constructor comment.
 */
public StudentSummaryInformation() {
    super();
}
public String getAddress(int index)
    throws TException
    {
    StructureInterface[] array = getArray("/ADDRESS");
    return array[index].getField("/");
    }
public String getGradePointAverage()
    throws TException
    {
    return getField("/GRADE-POINT-AVERAGE");
    }
public String getHousing()
    throws TException
    {
    return getField("/BALANCES/HOUSING");
    }
public String getIdNumber()
    throws TException
    {
    return getField("/ID-NUMBER");
    }
public String getName()
    throws TException
    {
    return getField("/NAME");
    }
public String getPhoneNumber()
    throws TException
    {
    return getField("/PHONE-NUMBER");
    }
public String getPIN()
    throws TException
    {
    return getField("/PIN");
    }
public String getSocialSecurityNumber()
    throws TException
    {
    return getField("/SOCIAL-SECURITY-NUMBER");
    }
public String getTuition()
    throws TException
    {
    return getField("/BALANCES/TUITION");
    }
public void setAddress(int nth, String value)
    throws TException
    {
    StructureInterface[] array = getArray("/ADDRESS");
    array[nth].setField("/", value);
    }
public void setGradePointAverage(String value)
    throws TException
    {
```

Fig. 5B

```
        setField("/GRADE-POINT-AVERAGE",value);
        }
public void setHousing(String value)
    throws TException.
    {
    setField("/BALANCES/HOUSING",value);
    }
public void setIdNumber(String value)
    throws TException.
    {
    setField("/ID-NUMBER",value);
    }
public void setName(String value)
    throws TException.
    {
    setField("/NAME",value);
    }
public void setPhoneNumber(String value)
    throws TException.
    {
    setField("/PHONE-NUMBER",value);
    }
public void setPIN(String value)
    throws TException
    {
    setField("/PIN",value);
    }
public void setSocialSecurityNumber(String value
    throws TException
    {
    setField("/SOCIAL-SECURITY-NUMBER",value);
    }
public void setTuition(String value)
    throws TException.
    {
    setField("/BALANCES/TUITION",value);
    }
}
```

Fig. 6

```
/* -- Published APIs and data types */ typedef long lxsHandle;

lxsHandle   lxsOpen(char *id, char *host,
                    unsigned short port);
int         lxsClose(lxsHandle handle);
int         lxsRead(lxsHandle handle, char *name, void *data, unsigned long length);
int         lxsWrite(lxsHandle handle, char *name, void *data, unsigned long length);
int         lxsCommit(lxsHandle handle);
int         lxsRollback(lxsHandle handle);
void        lxsGetLastNameRead(lxsHandle handle, char *name);
```

Fig. 10

```
package com.touchnet.util.base;

//*<copyright>*************************************************************
//*
//*          Copyright (c) 2000
//*          TouchNet Information Systems, Inc.
//*          All Rights Reserved
//*
//* This program is an unpublished copyright work of TouchNet Information
//* Systems, Inc. of Lenexa, KS. The program, all information disclosed
//* and the matter shown and described hereon or herewith are confidential
//* and proprietary to TouchNet Information Systems, Inc.
//*
//*<copyright>*************************************************************
//*
//* Change Log:
//* $Log: BinaryRenderingEngine.java $
//* Revision 1.4  2000/07/19 10:36:38  cln
//*
import com.touchnet.util.base.*;
import com.touchnet.util.*;
import java.math.BigInteger;
/**
 * This is a utility object that will manage the bit/byte manipulation
 * for a variety of data conversions.
 */
public class BinaryRenderingEngine
{

/**
 * Construct an object that will render byte arrays in a variety
 * of formats
 *
 */
public BinaryRenderingEngine()
{
    super();
}
/**
 * Access the value that is used when there is a rendering error
 *
 * @return byte
 */
public byte getErrorByte()
{
    return errorByte;
}
/**
 * Return a copy of one of these.
 *
 * @return COM.touchnet.xmlhost.BinaryRenderingEngine
 */
public static BinaryRenderingEngine getInstance()
{
    if (instance == null)
        instance = new BinaryRenderingEngine();
    return instance;
}
/**
 * This is called when there is a formatting exception such as a
 * string representation of a number that overflows the number of
 * bytes that number can handle
 *
 * @param data byte[]
 * @param exception java.lang.NumberFormatException
 */
public void handleFormatException(byte[] data, IllegalArgumentException exception)
{
    // For now, we just set the bytes to some pre-defined value. We may want
    // to make this a JavaBean that fires an formatting exception event to
    // the listeners.
```

Fig. 13A

```
    byte err = getErrorByte();
    for (int i = 0; i < data.length; ++i)
        data[i] = err;
    return;
}
/**
 * This will parse the string into a long
 *
 * Creation date: (7/12/00 11:21:57 AM)
 * @return long
 * @param number java.lang.String
 */
private long parseLong(String number)
{
    if (0 == number.length())
        return 0;

// The Java parseLong() is pretty stupid.  It can't handle a leading '+', so I need
    // an explicit check for that.

if ('+' == number.charAt(0))
        number = number.substring(1);

return Long.parseLong(number);
}
/**
 * Render a Java String from a series of bytes with 7-bit ASCII values
 *
 * @return java.lang.String
 * @param datum byte[]
 */
public String renderAsciiString(byte[] datum)
{
    int size = datum.length;
    char[] array = new char[size];
    for (int i = 0; i < size; ++i)
        array[i] = (char)renderPrintableAscii(datum[i],' ');

return String.valueOf(array);
}
/**
 * This will return a byte array containing 7-bit ASCII values generated
 * from the number passed
 *
 * @return byte[]
 * @param value int
 * @param size int
 * @param pad char
 */
public byte[] renderAsciiString(int value, int size, char pad)
{
    byte[] buffer = new byte[size];
    int    offset = 0;
    boolean negative = false;

if ((value < 0) && (pad != ' '))
    {
        value = 0 - value;
        negative = true;
        buffer[offset++] = (byte)'-';
    }

String string = Integer.toString(value);
    int length = string.length();
    for (; offset < size - length; ++offset)
        buffer[offset] = (byte)pad;  // Pad on left if needed byte[] stringBytes = string.getBytes();
    for (int i = 0; offset < size; ++offset, ++i)
        buffer[offset] = stringBytes[i];
```

Fig. 13B

```java
    return buffer;
}

/**
 * This will render the two bytes in the array into an
 * integer and return the string rendering of that
 *
 * @return java.lang.String
 * @param raw byte[]
 */
public String renderBigEndian16Bit(byte[] raw)
{
    short byte0 = (short)raw[0];  // Allow this to sign-extend
    short byte1 = (short)(raw[1] & 0x00FF);

short value =
        (short)((byte0 << 8)
            -         byte1
                );
    return String.valueOf(value);
}

/**
 * This will render the string numeric into two bytes
 *
 * @param java.lang.String
 * @return raw byte[]
 */
public byte[] renderBigEndian16Bit(String datum)
{
    byte[] raw = new byte[2];
    short value = 0;
    try
    {
        value = parseShort(datum);
        raw[0] = (byte)((value & 0x0000FF00) >> 8);
        raw[1] = (byte)( value & 0x000000FF);
    }
    catch(NumberFormatException exception)
    {
        handleFormatException(raw, exception);
    }
    return raw;
}
```

Fig. 13C

```java
/**
 * This will take a series of bytes which are expected to be
 * ASCII characters representing numbers, for example:
 *
 *   { '-','6','9','6','0' }
 *
 * would be -6960. It will return an int.
 *
 * @return int
 * @param raw byte[]
 */
public int renderIntegerFromAsciiBytes(byte[] raw)
{
    String number = renderAscii2String(raw).trim();

if ("".equals(number)) // All white space is considered a valid zero integer
        return 0;

int value = 0;
    try
        {
```

```
        value = parseInt(number);
        }
    catch(NumberFormatException exception;
        {
        handleFormatException(raw, new NumberFormatException());
        return -1;
        }
    return value;
    }

/**
 * This will render bytes representing a packed decimal field into
 * a string representation.  This is a helper routine that works
 * for both signed and unsigned packed values
 *
 * @return java.lang.String
 * @param raw byte[]
 * @param isSigned boolean
 */
private String renderPacked(byte[] raw, boolean isSigned, int offset)
    {
    char          signCharacter = ' ';   // Assume no sign
    StringBuffer  buffer        = new StringBuffer();
    boolean       minus         = false;

// Take a peek at the offset compared to the length of the raw data and see
    // where the decimal point goes.

int append      = 0;
    int insertAfter = -1;
    int digits      = (raw.length << 1) - 1;

if (offset > 0) // Append only
        append = offset;
    else
        {
        // We have a negative offset, the decimal will either be to the left or
        // somewhere in the middle.

insertAfter = digits + offset;   // Add because offset is negative
        if (insertAfter < 0) // The offset means only leading zeros...
            {
            buffer.append('.');
            for (int i = insertAfter; i < 0; ++i)
                buffer.append('0');
            }
        } // else int     rIndex       = -1;  // Index into the raw data
    int     nibble       = 0;
    boolean secondNibble = true;

for (int i = 0; i < digits; ++i)
        {
        if (secondNibble) // Bump input byte every other nibble
            ++rIndex;
        secondNibble = !secondNibble;

// Wait for the interation in which we have to stuff the extra decimal
        // point.

if (i == insertAfter)
            buffer.append('.');
        if (secondNibble)
            nibble = raw[rIndex] & 0x0000000F;
```

Fig. 13D

```
        else
            nibble = (raw[rIndex] >> 4) & 0x0000000F;

switch(nibble)
        {
            case 0: buffer.append('0'); break;
            case 1: buffer.append('1'); break;
            case 2: buffer.append('2'); break;
            case 3: buffer.append('3'); break;
            case 4: buffer.append('4'); break;
            case 5: buffer.append('5'); break;
            case 6: buffer.append('6'); break;
            case 7: buffer.append('7'); break;
            case 8: buffer.append('8'); break;
            case 9: buffer.append('9'); break;
            default:
                handleFormatException(raw,
                        new IllegalArgumentException("Invalid value in data"));
                return "[data format error]";
        } // switch.
    } // for // Now handle the last nibble which is the sign.

nibble = raw[rIndex] & 0x0000000F;
    switch(nibble)
    {
        case 0x0A:
        case 0x0C:
        case 0x0E:
        case 0x0F:
            break;
        case 0x0D:
        case 0x0B:
            minus = true;
            break;
        default:
        {
            handleFormatException(raw,
                new IllegalArgumentException("Invalid value in data"));
            return "[data format error]";
        }
    }

// Append any additional trailing zeros that are a result of the decimal shift
    // in the type descriptor for (int i = 0; i < append; ++i)
        buffer.append('0');

String rendered = buffer.toString();
    if (isSigned && minus)
        rendered = '-' + rendered;
    return rendered;
}
/**
 * This is a helper method that will render PIC templates that have been pre-determined
 * to be numeric. It will handle both EBCDIC or ASCII input numerics.
 *
 * @return byte[]
 * @param raw java.lang.String
 * @param template byte[]
 * @param offset int
 * @param isAscii boolean
 */
private byte[] renderPacked(String raw, int size, int offset, boolean isSigned)
{
    byte[]   buffer  = new byte[size];
    int      shift   = 0;   // This is the decimal place shift that we find in the
                            // data. It is used to reconcile the offset parm.
    boolean  decimal = false; // ... until we hit a decimal point, then it is true
```

Fig. 13E

```
boolean                 = false;
byte[] userdata = raw.getBytes();
byte[] numeric  = new byte[userdata.length];  // Just the numeric part of the data
int    numSize  = 0; // Count of just the numerics in the user data for(int i = 0; i < userdata.length; ++i)
{
    switch(userdata[i])
    {
        case (byte)'0':
        case (byte)'1':
        case (byte)'2':
        case (byte)'3':
        case (byte)'4':
        case (byte)'5':
        case (byte)'6':
        case (byte)'7':
        case (byte)'8':
        case (byte)'9':
            numeric[numSize++] = (userdata[i]);
            if (decimal) ++shift;
            break;

case (byte)'-':
            minus = true;
            break;
        case (byte)'+':
            break;
        case (byte)'.':
            decimal = true;
            break;
    } // switch
} // for // Now we have the digits separated from the sign and decimal point. Now
// we have to normalize the decimal offset and the digit count with the
// template. What makes this additionally complex is the observation that
// there can be truncation on either side of the user data if the shift
// overflows the template. Consider the following examples:
//
// Assume:
//
//    template = 99999 with shift -2 (via PIC 999V99)
//
//    Userdata    Answer
//    --------    ------
//    1230        23000  (truncation on left)
//    123         12300
//    12.3        01230
//    1.23        00123
//    .123        00012  (truncation on right)
//
//    At this point in the code, we have the user data filtered out
//    into a the string "123". We need to align the decimal point
//    logically based on the shifts in the template minus the logical
//    shifts from the explicit decimal point in the data.

int    index = numSize - ((size << 1) - 1) - offset - shift;
int[]  value = new int[2];
for (int i = 0; i < size-1; ++i)
{
    for (int j = 0; j < 2; ++j)
    {
        if (index < 0)
            value[j] = 0;
        else
        if (index < numSize)
            value[j] = numeric[index] & 0x0000000F;
        else
            value[j] = 0;
        ++index;
```

Fig. 13F

```
    }
    buffer[i] = (byte)((value[0] << 4) | value[1]);
}

// Do the last byte as a special case since it contains the sign nibble for (int j = 0; j < 2; ++j)
{
    if (index < 0)
        value[j] = 0;
    else
    if (index < numSize)
        value[j] = numeric[index] & 0x0000000F;
    else
        value[j] = 0;
    ++index;
}
int sign = 0x0C;  // Plus
if (isSigned && minus)
    sign = 0x0D;
buffer[size-1] = (byte)((value[0] << 4) | sign);
return buffer;
}

METHOD OF ACCESSING DATA AND LOGIC ON EXISTING SYSTEMS THROUGH DYNAMIC CONSTRUCTION OF SOFTWARE COMPONENTS

CROSS REFERENCE TO RELATED APPLICATIONS

This application is a continuation-in-part application of application Ser. No. 09/385,903 filed Aug. 30, 1999, now U.S. Pat. No. 6,209,124.

BACKGROUND OF THE INVENTION

The present invention relates generally to the field of computer software development tools. It relates in particular to the generation of executable software components based on existing structured data in non-component-based languages to access the contents of the structured data at runtime.

Much of the new software development projects are moving to object-oriented development environments from the existing procedural, structured development environments. More progressive development environments also exploit the use of component-based design, which is an extension of object-oriented programming techniques. Developers have confirmed what computer science predicted a couple of decades ago—namely that object-oriented and component-based design yields more maintainable and reusable code. Given the complexity of modern network-based or "e-Business" applications, there is a strong desire among businesses to utilize modern development languages and techniques to manage the complexity.

One of the most popular programming languages for the development of network-centric applications is Java®. Java, developed by Sun Microsystems, is an object-oriented, multithreaded, platform independent programming language. The design of the language, coupled with the rich set of available class libraries along with the specification of a component model, called JavaBeans®, within the language make it well-suited to develop applications that interact with other business applications or customers via the World Wide Web.

One component framework built by Sun Microsystems for the Java environment is the JavaServer Pages ("JSP") framework. A JSP document contains a mixture of a text-based markup language (usually HTML but it can also be an XML-derived grammar) with small segments of Java code and JSP-specific tags. This all-text document is dynamically translated into Java source code and compiled dynamically into a Java binary file that is suitable for execution within a Java Virtual Machine environment. At present, JSPs are used primarily as a technique to separate the business logic in server-based Java applications ("servlets") from the presentation of the data to a web browser in HTML.

As companies create a presence on the Internet for business-to-business transactions and business-to-customer transactions ("web transactions"), there is a strong desire to use the design methodologies and language support for object-orientation and component based design. However, most of the application logic and data that are required to complete a web transaction are contained within existing procedural code. This procedural code was developed using languages such as COBOL and PL/I that are poorly-suited to network-based programming inherent in building web transactions. Furthermore, this business-critical procedural code was developed and is maintained by programmers who, by and large, do not have the skills in object-oriented design and development and component-based software architectures. Even for companies that have strong programmer skills in modern programming languages and software development techniques, there are substantial barriers in facilitating web transactions from an existing procedural code base. It is inherently cost-prohibitive to recreate the business applications in an object-oriented programming language such as Java. Even if the funding could be justified, the time-to-market is too long to meet business goals. Most companies have recently completed reinvesting in their existing procedural code base to ensure that it is compliant for date processing in the year 2000 ("Y2K compliant"). This indicates a strong willingness by corporations to continue to gain benefit from the existing base of code instead of simply replacing it.

Companies wanting to engage in e-Business face two conflicting desires. The first is the desire to manage software complexity inherent in web transactions with modern object and component-based programming languages. The second is the desire to continue to leverage business logic and data found in the existing applications developed with procedural programming languages and techniques.

One popular technique to bridge existing systems and new systems is the use of the Extended High-Level Language Application Programming Interface ("EHLLAPI" or "screen scraping"). The term "screen scraping" is indicative of how the solution operates. Applications are developed, presumably using modern development languages, to mimic the behavior of a human terminal user. The software reads ("scrapes") the textual information from the terminal display and interprets the data much as a human would. Similarly, feedback is provided to the existing system by the new application simulating the entry of keystrokes by a human. This simulation of human terminal interaction with software is problematic. The nature of such applications is highly process-oriented, and at first glance, would appear to be easily automated in software. However, humans are vastly more capable of intelligent screen navigation than is present software. Humans are also able to recognize out-of-context situations, such as error screens or indications that the host computer is unavailable. The design of screen navigation logic and error detection and recovery logic is often as complicated as the network programming and complexities of web transactions that the solution was trying to avoid. The screen scraping solution often runs into problems of scalability and performance. The conventional or legacy software systems were designed to interact with dozens or perhaps hundreds of corporate terminal users. When these legacy software systems become the conduit for thousands or millions of Internet users, the architecture often fails to scale to meet the demand.

Another technique to bridge between web transactions and existing systems is to access the persistent data directly. Such a bridge is described in U.S. Pat. No. 6,081,808 (IBM patent) wherein the data from the legacy system is directly accessed, but the business logic of the legacy application is not applied. While workable solutions exist for accessing databases from client/server or network-centric applications, this technique completely bypasses the business rules that apply to the raw data. Most data processing systems of any complexity are more than the presentation of stored data. They use software applications to manipulate the data into usable information. Therefore, a great need exists for a method of accessing and incorporating the complexity of legacy processing system applications with the accessing of the legacy data while dynamically manipulating that legacy logic and data for use on present day object-oriented environments.

Other solutions to bridging the gap between modern multi-tier object-oriented network-centric applications and the existing procedural legacy applications exist in middleware products such as IBM's® MQSeries or the distributed features in IBM's CICS product. Even with these middleware products, there is a need for programmers to understand the differences in the underlying binary data formats of the legacy computing platform and the architecture of the platforms on which the object-oriented systems run. When data is passed between platforms, data conversion must be programmed to account for the architectural differences. For example, for each field in each record that is a text field, such as a person's name, if the source information comes from an IBM S/390 mainframe system, each letter will have to be converted from the internal mainframe EBCDIC encoding to the Java Unicode encoding for alphabetic letters. There is also an issue with the ordering of bytes in different computer architectures. For example, the number 6,091,960 is represented on an Intel Pentium® machine architecture as the hexadecimal number B8F45C00 whereas the same number on an IBM S/390 mainframe is represented internally as 005CF4B8. (Note that the ordering of the hexadecimal pairs of digits are backward with respect to each other). The code to translate all of the internal data type representations is error-prone due to the need for programmers to understand all of the machine architectures they will encounter and the low, bit-level manipulation that is required for many of the translations. The present invention provides a unique solution to the problem of bridging web transactions to existing applications.

SUMMARY OF THE INVENTION

An objective of this invention is to dynamically construct a software component from the contents of the binary data contained within a running procedural application on an existing system. The resulting software component is able to be programmed using modern object-oriented and component-based languages and processes to facilitate the development of systems to be used, for example, for e-Commerce.

Another objective of this invention is to transition between procedural skills and languages into object and component-based languages in order to leverage the skills of two important, but disparate, groups of programmers present within most corporate environments. Procedural programming began to emerge as the programming technique of choice in the late 1960's and early 1970's and still represents a large percentage of the programming skills in the marketplace. Procedural code and the way that it typically interacts with the data—in the form of record-oriented input and output—represents the bulk of the software currently in production. The businesses have encapsulated the algorithms and processes, called "business rules", in the form of this procedural software. The result of this invention is to facilitate the reuse of existing procedural code that represents a corporation's business rules, and possibly their competitive advantage in the marketplace, and integrate that valuable resource into modern web transactions that are developed using object-oriented and component-based development techniques.

The present invention is comprised of three primary application frameworks. The first framework ("workbench") takes source record layout definitions in the programming language in which they were originally developed and generates a language-neutral and machine architecture-neutral representation of the structure and fields within that record layout. For example a COBOL copybook, a Pascal record or a PL/I record definition is copied from the existing application by the programmer using commonly-available text editing software such as ISPF/PDF on a mainframe system or vi on a Unix system to the system hosting the workbench framework. The programmer uses the workbench software that is part of the present invention to pass that textual source code to a lexical analyzer and parser that is part of the workbench framework of the present invention. The workbench will generate a language-neutral representation of the fields within the record layout along with the structural context of the fields. The structural context means the hierarchical structure within the record, for example that the fields are contained within a homogeneous array of fields or that the fields are part of a collection of heterogeneous fields in a substructure of the whole record structure. This part of the present invention creates the data about the data in the copybook ("metadata"). The metadata is saved in a repository on some persistent storage medium such as a database or within a file system. FIG. 8 demonstrates the flow of information between the existing source code for an application and the workbench. This process is a one-time preparatory step and is "offline" with respect to the application as it runs as illustrated in FIG. 11.

The second application framework is a programming interface for the legacy application to communicate with the runtime environment. This is comprised of a set of program subroutine calls ("Application Programming Interfaces" or "APIs") that implement an open/close/read/write metaphor. This programming metaphor, demonstrated in FIG. 9, is typical of procedural programming. There is an implementation of the API set that is part of the present invention for each programming language. Examples include, but are not limited to, COBOL, COBOL under CICS, PL/I, Pascal, or C. FIG. 10 shows the implementation of the programming interface in the C programming language. This framework of the present invention is responsible for delivering two pieces of information to the component runtime framework of the present invention. 1) The name of or numeric reference to the record layout, which is used to identify the metadata created by the workbench, and 2) a reference to the binary data contained within the record layout at the time the programming call to read or write data. The reference to the binary data is most likely a memory address (a "pointer") as implemented in most programming languages. The implementation of the APIs includes calls to an underlying interprocess communications mechanism such as FIFOs in the Unix operating system or named pipes in personal computing operating systems such as Windows NT or OS/2. The interprocess communications mechanism can also be an inter-machine networking protocol such as TCP/IP sockets or APPC over SNA networks. The specific implementation is hidden via a programming abstraction from the legacy applications programmer utilizing the API framework. This second application framework is co-located on the same computer platform as the customer's existing procedural code. As a result, it is designed to be a minimal implementation of programming logic and essentially becomes a bridge between the customer code and the sophisticated processing and complexity inherent in the third application framework described below.

The third application framework of the present invention is the "component runtime environment". While the legacy application is running, it will have been programmed to either read or to write a record using the APIs that are part of the present invention and are described above (an example of which appears as FIG. 10). The process of reading or writing a record from the legacy application perspective is conceptually the same, but the implementation is different, so they are discussed separately. When the host writes a record using the APIs supplied by the present invention, the runtime environment component creates a new instance of the component identified for this record. The binary contents from the legacy application are loaded into the software component. This automates the process that would otherwise be tedious and error-prone programming to translate the bit patterns appropriate for source platform into the bit patterns appropriate for the destination platform. The component is now suitable for object-oriented programming by applications that utilize the present invention to gain access to dynamic data that may have been created by a combination of persistent data and business logic within a legacy application.

The process of the legacy application reading the data from the component of the present invention is similar. The legacy application reads a record using the APIs supplied by the present invention (for example using the IxsRead( . . . ) example from FIG. 10. The API will identify the record to be read from the runtime environment. The API call pauses execution of the legacy application until the binary contents have been loaded into the memory reference of the legacy application. The runtime environment framework will create a new instance of the component identified by the API and enable it to be populated with information. The component is populated using object-oriented programming techniques by applications that use the present invention. When the component is fully populated, the component will construct a binary data layout suitable for the architecture and programming language of the legacy application and present the binary data record to the legacy application using the interprocess communications mechanism implemented within the present invention. When the binary data is presented to the API framework of the present invention, the legacy application will unblock with the contents of the data record populated with the values programmed into the component.

FIG. 11 represents the high-level relationship between these three frameworks. The workbench framework is an offline (or non-runtime) process that maps the existing data structures from the existing source code into metadata that is stored in a repository. The two online frameworks, the API and the component runtime environment, interact programmatically using the metadata in the repository to bridge any architectural differences between the system running the procedural code and the system running the object-oriented code.

BRIEF DESCRIPTION OF THE DRAWINGS

For a complete understanding of the present invention reference should be made to the following detailed description in conjunction with the accompanying drawings.

FIG. 3 shows a sample legacy record definition in the form of a COBOL copybook.

FIG. 4 shows the language-neutral representation of a legacy record definition that corresponds to the COBOL copybook in FIG. 3.

FIG. 5 shows the source code in Java for the base class for all generated components.

FIG. 6 shows sample source code that implements the legacy record definition in FIGS. 3 and 4.

FIG. 10 shows the implementation of a programming interface to the present invention using the C programming language.

FIG. 13 shows a partial listing of the BinaryRenderingEngine class that is used to transform the underlying architecture-specific data fields to and from their corresponding character values.

DETAILED DESCRIPTION OF THE PREFERRED EMBODIMENT

Figure 2:
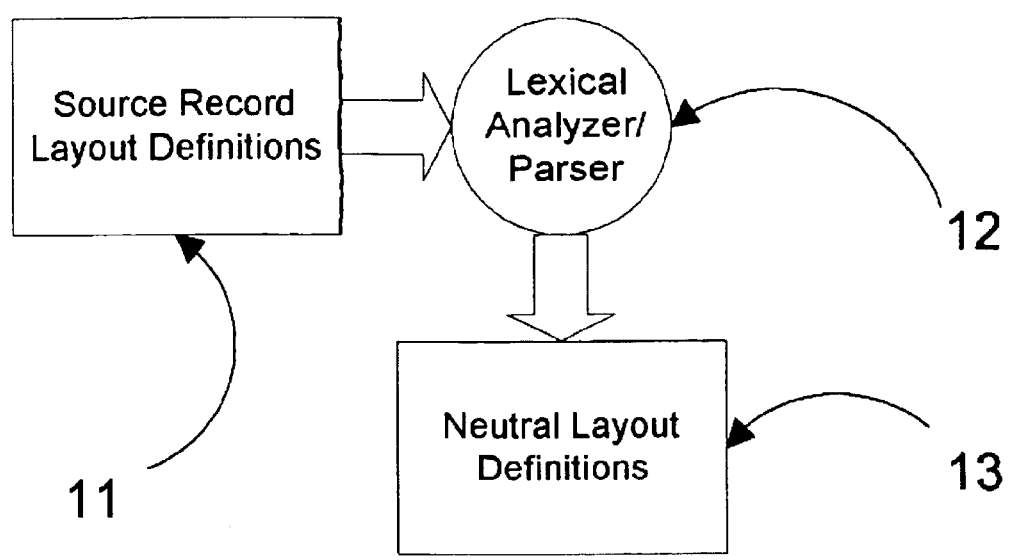
FIG. 2 is a block diagram showing the flow of data from the source code representation to an architecture-neutral and language neutral representation.
Figure 12:
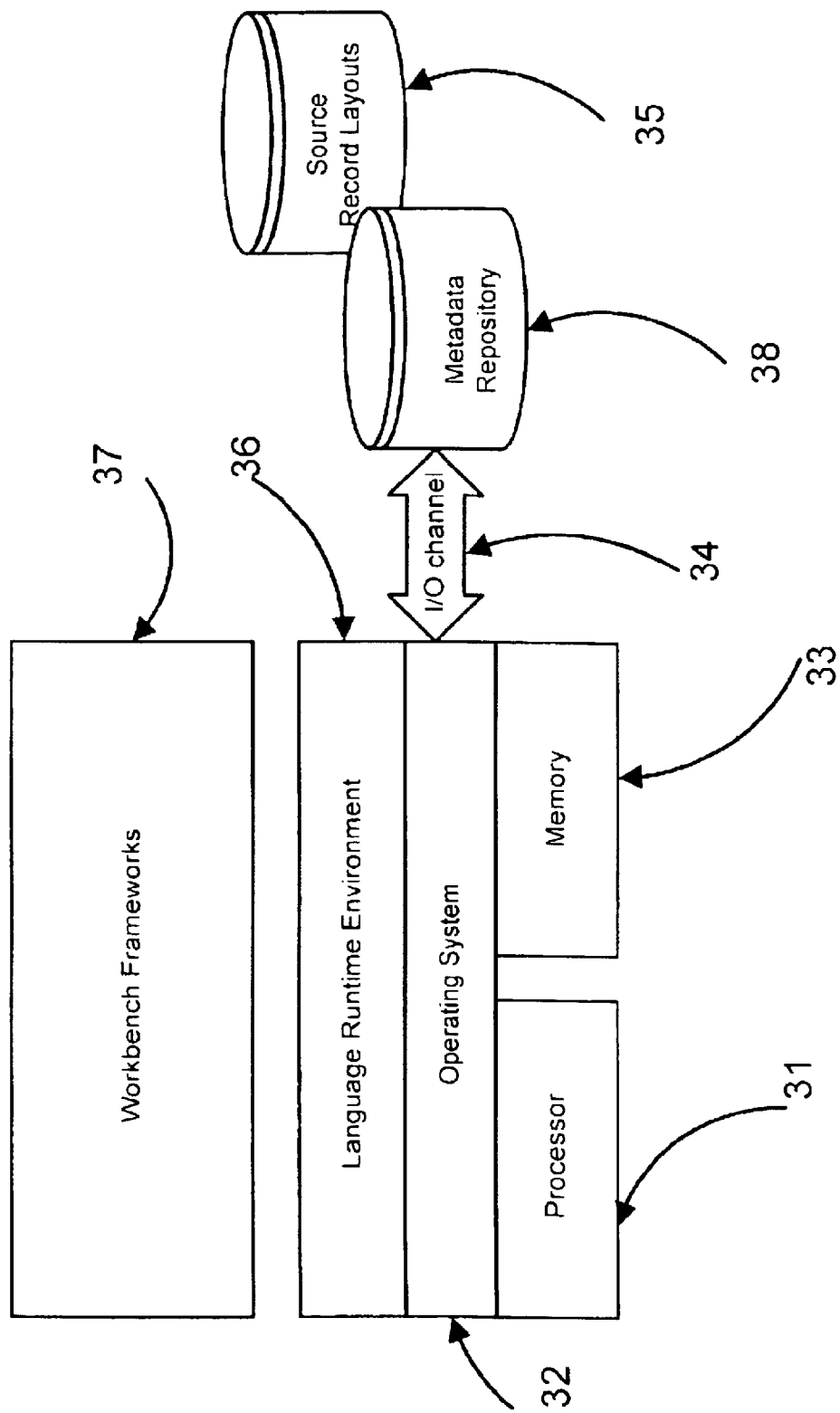
FIG. 12 shows a block diagram of the computer system on which the workbench frameworks reside.

As described below, the present invention will be carried out on a single computer or by one or more computers in a computer network. Referring to FIG. 12, the computer on which the workbench framework is hosted contains a processor 31, memory 33 and an operating system 32. Thus, for example, the computer used in the present invention is a personal computer or workstation that is running an Intel or RISC processor running an operating system such as Microsoft Windows NT, IBM OS/2, IBM AIX or Sun Microsystems Solaris. The workbench framework ("workbench") 37, one of three frameworks, utilizes existing source record layout definitions 35 as represented by a human readable textual description of a record in the source code of a computer language. This is stored on a persistent medium such as a hard disk drive and manipulated via a text editor that is not part of the present invention. An existing COBOL copybook, an example of which is shown in FIG. 3, or a PL/I record definition in the source code of an existing legacy application are examples of a source record definition. However, the source languages capable of being utilized by the present invention are not limited to COBOL or PL/I. The source record definition is processed by a lexical analyzer FIG. 2 capable of translating the language-specific representation of a record layout into a language-neutral and computer-architecture neutral representation of the data layout ("metadata"). This metadata is stored on a persistent storage medium 35 of FIG. 12 and accessed and managed via the workbench. An example of metadata is shown in FIG. 4. This corresponds to the COBOL copybook in FIG. 3. The relationship between the COBOL copybook and the metadata is isomorphic. The <name> tag in the metadata translates directly into the name of the variable in the original COBOL copybook. Preferably the lexical analyzer implements an LALR(1) grammar, as is well-known in the art, but this is not a requirement of the present invention. The preferred embodiment of the present invention implements this translation to a language-neutral representation of the record layout for reasons of portability and runtime performance although this translation step is not a requirement of the present invention. As a less-preferred alternative to the language-neutral representation of the metadata would be to simply use the record layout from the original source code. However, it is anticipated that the performance degradation as a result of this implementation would limit the practicality of directly parsing the original-language source code at runtime. This would reduce the requirements of the code in the workbench to managing a repository of source-code definitions instead of managing a repository of language-neutral metadata.

Figure 1:
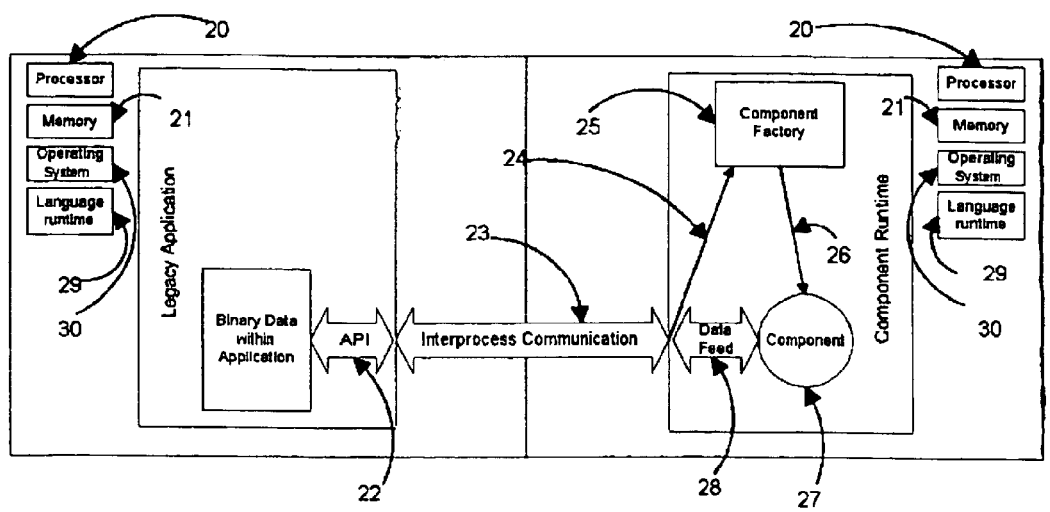
FIG. 1 is a block diagram showing a computer system on which a legacy application and the runtime environment of the present invention reside as well as the flow of data between the frameworks.

The application programming interface ("API"), the second of three frameworks of the present invention, is a language-specific and runtime environment-specific software layer that enables the legacy applications programmer working with a specific language within a specific runtime environment to access the facilities of the runtime framework of the present invention. Referring to FIG. 1, the API 22 represents the programming interface that passes a reference (usually via a memory address or "pointer") to the binary data within the legacy application to and from the interprocess communications layer to utilize services of the runtime frameworks of the present invention. An example of a programming interface has been built for C programmers on an IBM S/390 mainframe system to access the runtime services of the present invention. This example is presented in FIG. 10. However, this is an example of legacy runtime environments supported by the API framework. Other implementations for other languages, operating systems and runtime environments are also supported by the present invention.

Referring to FIG. 1, the computer on which the legacy application is hosted contains a processor 20, memory 21 an operating system 30 and a language runtime environment for the programming language in which the legacy application is written. Thus, for example, the computer used in the present invention for hosting the legacy application is a server class computer running an Intel, RISC or CISC processor running an operating system such as Microsoft Windows NT, IBM OS/2, Compaq OpenVMS, Sun Microsystems Solaris, IBM AIX, or IBM OS/390. The computer on which the component runtime is hosted, contains also contains a processor 20, memory 21, an operating system 30 and a language runtime environment for the programming language in which the component runtime application is written. The language runtime may be a Java Virtual Machine, or a more traditional runtime environment that ships with the language compiler under which the component was developed, such as the MSVCRT.DLL that ships with Microsoft Visual C++. The language runtime is used by the present invention but should not be confused with the component runtime. Thus, for example, the computer used in the present invention for hosting the component runtime is a server class computer running an Intel, RISC or CISC processor running an operating system such as Microsoft Windows NT, IBM OS/2, Compaq OpenVMS, Sun Microsystems Solaris, IBM AIX, or IBM OS/390.

The legacy application and the component runtime may co-exist on the same computer or they may exist on separate computers connected by a computer network. Thus, referring to FIG. 1, the interprocess communications 23 may be an interprocess and inter-computer communications mechanism implemented as a computer networking protocol. Thus, for example, the legacy application may be communicating with the component runtime via an operating system-defined serial interprocess communications mechanism such as named pipes or FIFOs, or they may communicate via a networking protocol such as TCP/IP sockets, IBM SNA APPC communications, or asynchronous serial communications.

The component runtime, the third of three frameworks of the present invention, is the most complex of the three. The component runtime is responsible for two basic operations. The first is the construction of components based on a reference to the metadata constructed by the workbench. The second is the population of the contents of that component in an architecture-neutral form and the emission of the contents of the component in an architecture-specific binary form when communicating with the legacy application. These two primary operations of the component runtime is best understood by describing the sequence of events when binary data is to flow from the legacy application to the runtime and similarly when binary data flows from the runtime to the legacy application.

The present invention implements the following operational processes to implement data flow from a legacy application to the component runtime. Referring to FIG. 1, the legacy application is running on a computer processor and has constructed a representation of a business datum in a manner appropriate for the application using facilities in the legacy application source code. The legacy application calls the API 22 of the present invention with a reference (or "pointer") to the architecture-specific binary data and an indication of the name of the record as implemented by the API. The API 22, sends the architecture-specific binary data and the name of the legacy record to an interprocess communications mechanism 23. This interprocess communications is typically, but not limited to, a TCP/IP network connection. The name of the legacy record is used as a reference to the metadata of the legacy record created by the workbench.

The component runtime then passes the reference 24 to the metadata to the component factory 25. The component factory is part of the software that comprises the component runtime. The responsibility of the component factory is to dynamically construct the objects that manage the data being exchanged between the legacy application and the object-oriented systems that interoperate with the objects constructed by the component runtime. It implements the "Abstract Factory" design pattern as described in "Design Patterns. Elements of Reusable Object-Oriented Software" by Gamma, et. al. and is well-known to those skilled in the art. The component factory determines if an object class description exists for the metadata. An example of this using a component runtime in Java would be an object of type Class. If the class for the object exists, the object class is used to construct a new instance of the class that can represent the contents of the legacy application's binary record. If there is no object class description available to the component factory, the metadata is used by the component factory to generate human-readable, textual source code in the object-oriented language implemented by the component runtime. Thus, for example, if the Java language is used as the object-oriented language in which to implement the component runtime, then the component factory would generate Java source code that is appropriate to interpret the contents of the binary data within the legacy application's record structure. The source code, in this example Java source code, is used as input into a compiler implementing the language, in this example, a Java compiler. The compiler will generate a binary class definition file. That class definition file is used to construct a new instance of the class that is suitable for managing the binary data from the legacy record.

The next step in the process is for the component runtime to pull the data from the interprocess communications mechanism 23 and pass the data to the component via the data feed 28 that is accessible by the generated component. The component was generated by the component factory with the metadata for a specific legacy record layout, so there is code generated to accommodate the architecture-specific binary data stream. On a datum by datum basis, the architecture-specific binary data stream is read by the specially-created component and converted to corresponding fields within the generated component by a binary rendering engine. This includes the transformation of textual information from one character encoding set, for example EBCDIC to the character encoding of the component runtime, for example Unicode. It also includes the transformation of little-endian architecture numbers to big-endian architecture numbers using appropriate bit manipulation for that particular field. Using the metadata example from FIG. 4, the software component would have been specifically constructed to perform the following series of operations, assuming that metadata came from a machine on an IBM S/390 architecture and the component runtime was written in the Java programming language:

1) Read 6 bytes (since the "size" attribute of the metadata indicates this is a six-byte field) and convert from binary-coded-decimal ("BCD") to an integer value. Assign that number to the object field named "ID-NUMBER".
2) Read 6 bytes and convert from BCD to an integer value. Assign that number to the object field named "PIN".
3) Read 35 bytes and convert from EBCDIC to Unicode. Assign that character string to the object field named "NAME".
4) For each of the three elements in the array:
   a) Read 25 bytes and convert from EBCDIC to Unicode. Assign that string to the object field "ADDRESS" within the array in the object.
5) Read 12 bytes and convert the values from EBCDIC to Unicode. Assign that string to the object field named "PHONE-NUMBER".
6) Read 11 bytes and convert the values from EBCDIC to Unicode. Assign that string to the object field named "SOCIAL-SECURITY-NUMBER".
7) Read 3 bytes and convert those three bytes to a float number. Assign that float value to the object field named "GRADE-POINT-AVERAGE".
8) Read 3 bytes and convert from a S/390 packed decimal format to an integer. Assign that integer value to the object field named "BALANCES/TUITION".
9) Read 3 bytes and convert from a S/390 packed decimal format to an integer. Assign that integer value to the object field named "BALANCES/HOUSING".

The conversions from one data type to another is accomplished via the BinaryRenderingEngine class that is part of the component runtime. A partial listing of that class in the Java programming language is listed in FIG. 13.

The process for sending architecture-specific data to the legacy application is similar, but the process starts with the object-oriented code. The programmer programming in the object-oriented language, for example Java, requests from the component runtime that an object of a specific type is constructed. If the binary class definition file exists for that type, a new instance is constructed with empty values. If there is no object class description available to the component factory, the metadata is used by the component factory to generate human-readable, textual source code in the object-oriented language implemented by the component runtime. Thus, for example, if the Java language is used as the object-oriented language in which to implement the component runtime, then the component factory would generate Java source code that is appropriate to construct an appropriate architecture-specific binary data stream to be sent back to the legacy application. The object-oriented programmer populated the fields within the component with values that are applicable to the business problem it was designed to solve. When the object-programmer is ready to pass the information to the legacy application, it will be passed to the component runtime. In the Java component runtime example shown in FIG. 5, this process will be invoked via the write (OutputStream)method. Since the component was generated to match a specific legacy record definition, its source code was generated to convert the values in the component to the architecture-specific binary representation using the binary rendering engine using the reverse process of steps described in the above 9-step example. This binary data is passed through the data feed 28 to the interprocess communications mechanism 23. The API 22 unblocks from the legacy application's call to read the information with the binary data underlying the reference that was given by the API 22 to the legacy record definition. The legacy application is insulated from the transformations to a different architecture and the manipulations from object-oriented code that results from the operation of the component runtime framework of the present invention.

Figure 7:
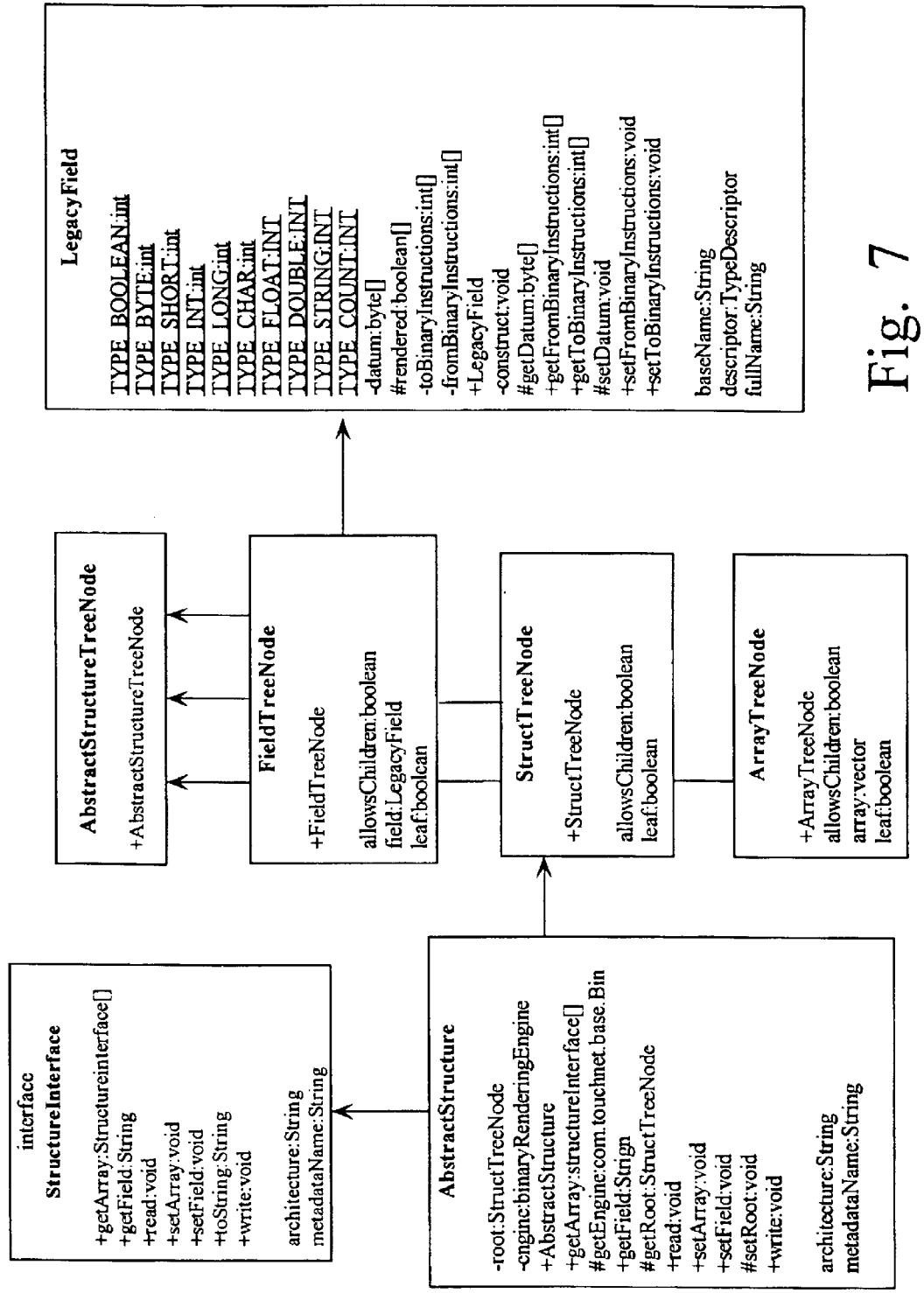
FIG. 7 shows the Unified Modeling Language description of the base class for all generated components shown in FIG. 5.
Figure 8:
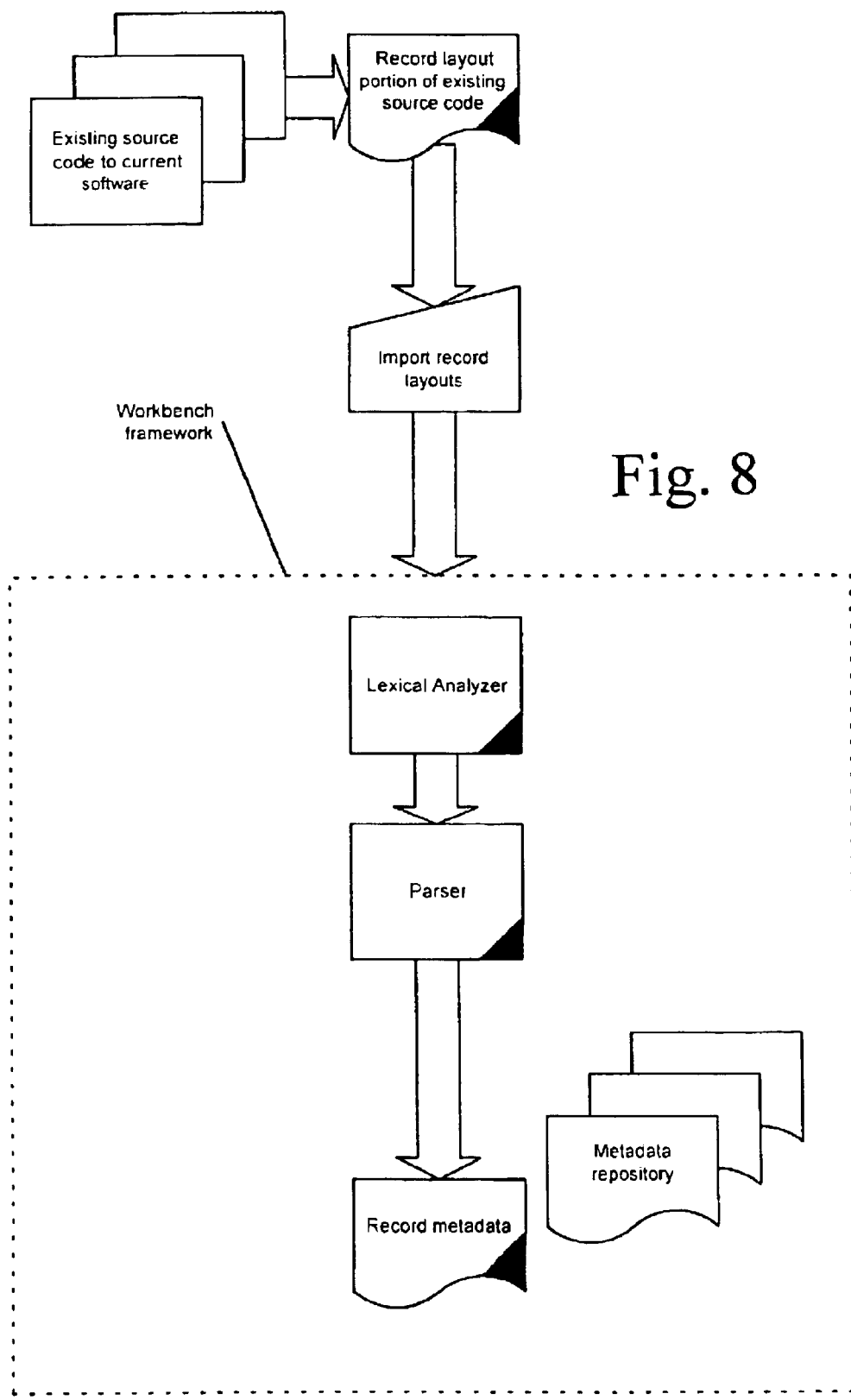
FIG. 8 shows the flow of information in and out of the workbench frameworks.
Figure 9:
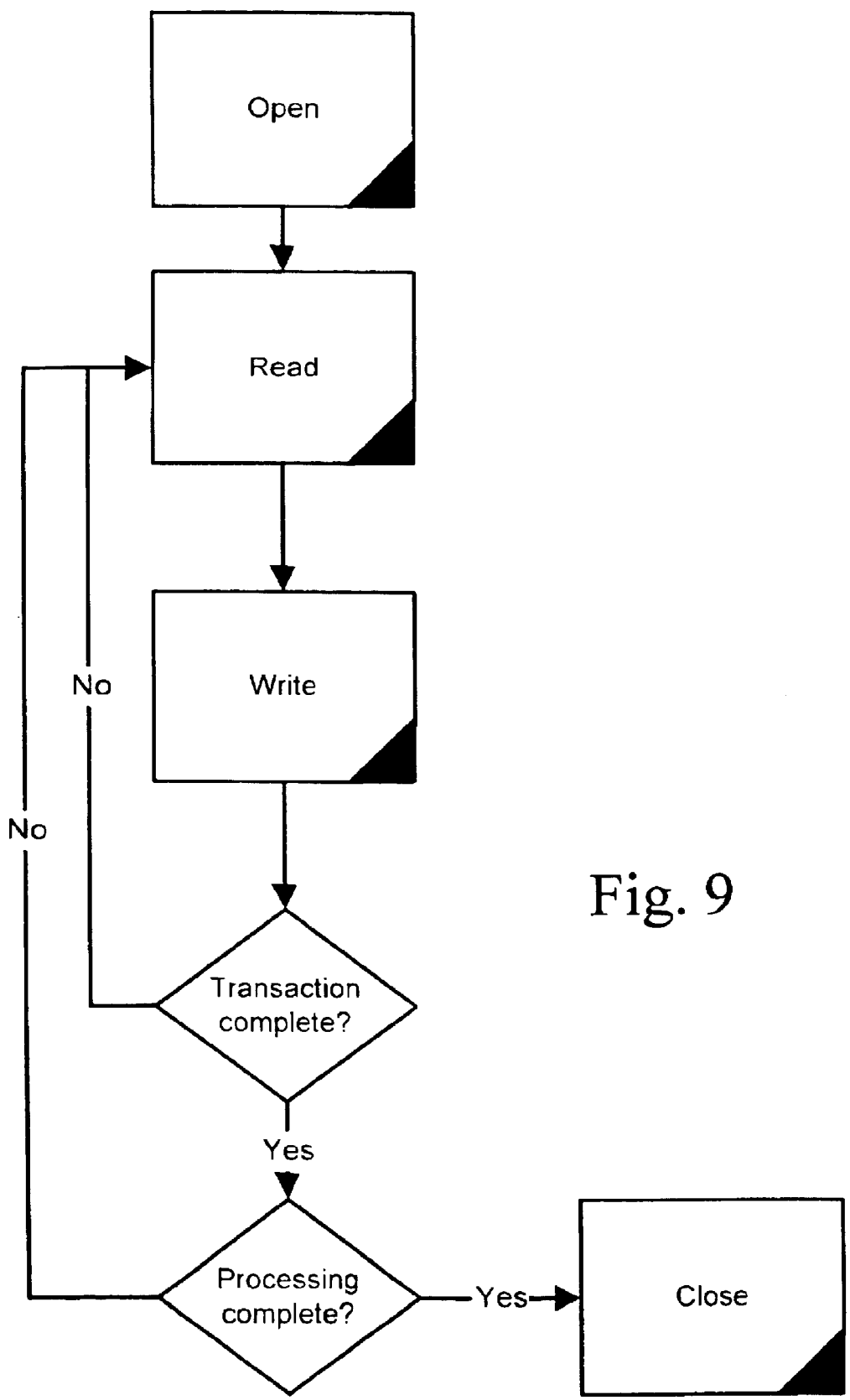
FIG. 9 shows the flow of a typical procedural program and one that specifically interacts with the invention.
Figure 11:
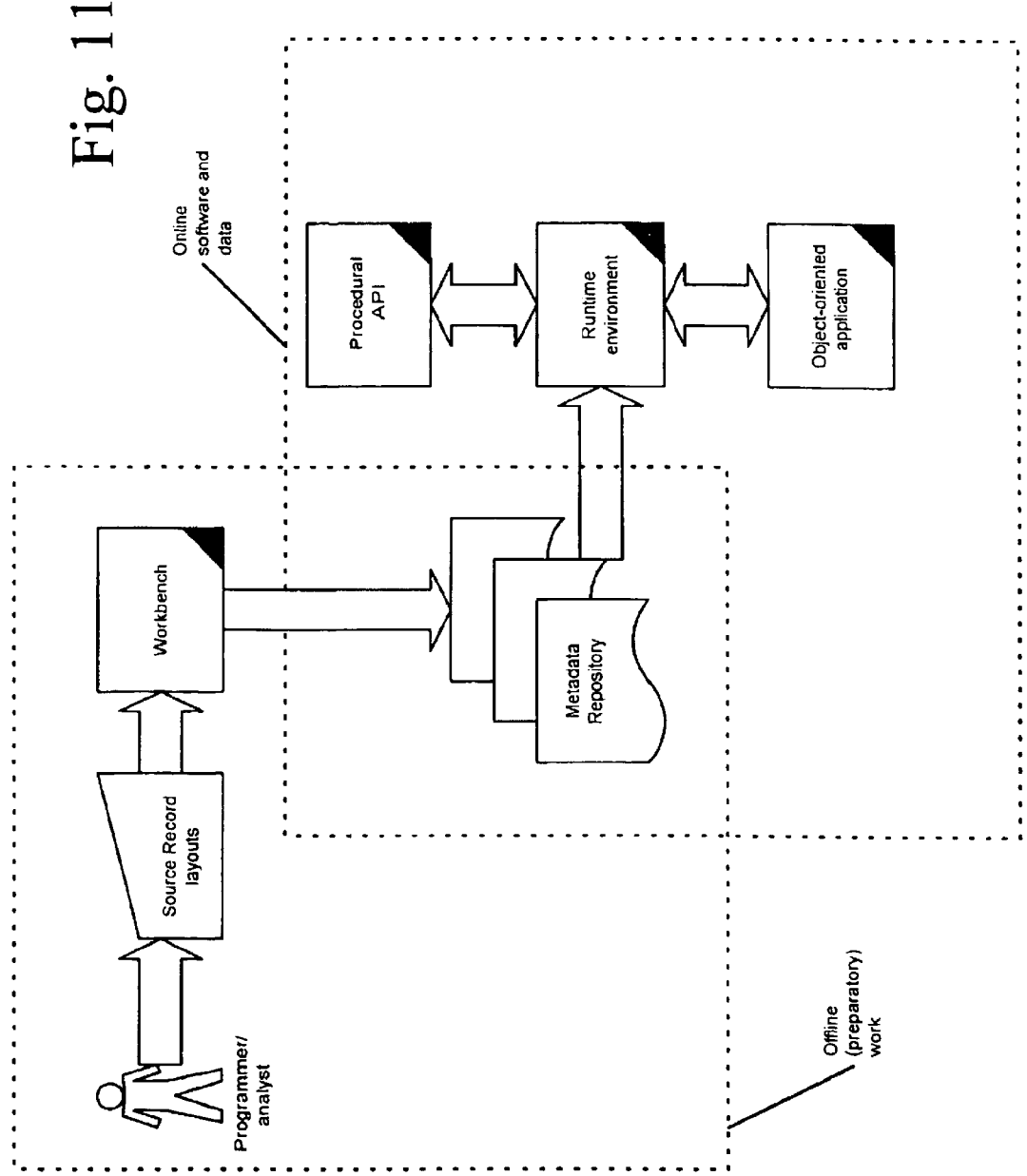
FIG. 11 shows the high-level relationship between the three frameworks of the invention (the "Workbench", the "API" and the "Component Runtime Environment") and the use of the metadata obtained from the workbench in the runtime environment.

Referring to the UML diagram in FIG. 7, each component contains a binary rendering engine that is responsible for converting the information within the component to and from the architecture-specific binary data used by the legacy application. This process is more complex than is initially apparent. The first complexity comes from the data translation. There are multiple character representations, such as single-byte ASCII and EBCDIC and the double-byte Unicode. There are also differences in the byte ordering ("endian-ness") of binary integer representations among processor architectures. For example, the Intel x86 processor family represents the least significant byte of the integer first ("little-endian") whereas most other processor architectures such as the Sun SPARC and the IBM S/390 processor architectures represent the most significant byte first ("big-endian"). Finally, not all elementary data types are supported on all processor architectures. For example, the IBM S/390 processor architecture implements binary coded decimal (BCD) data as a basic data type. BCD is not supported natively on Intel or most RISC processors. The second form of complexity occurs in the way that language compilers generate the legacy record definitions. Most computer processors can perform arithmetic computer operations faster if the numbers on which they operate are aligned on an even machine word boundary, usually an even multiple of two, four or eight bytes. The compiler developers will exploit this performance improvement by inserting additional bytes ("filler bytes") in the record definition to ensure alignment on even boundaries. The generated component accommodates these additional filler bytes in addition to the translation of each datum. A partial listing of the BinaryRenderingEngine is included in FIG. 13. It reveals part of the complexity that the present invention encapsulates so that applications programmers are not exposed to this level of architecture-specific binary representations.

Having thus described our invention, we claim the following to be new and desire to secure by Letters Patent that which is set forth in the following claims. We claim:

1. A method for translating the contents of a binary data record existing in a programming language to a component in an object-oriented programming system comprising the steps of:

(a) determining a data record layout of a binary data record in an architecture-specific program, said data record layout comprising a name component and a contents component;

(b) associating a first reference to said name component and a second reference to said contents component of said data record layout, said first and said second references operating as address parameters to allow a programming interface to select said name component and said contents component from said data record layout in response to a data request;

(c) modifying said architecture-specific program to include said first and said second references for use by said programming interface and to include a base component from which generated source code can be derived using object-oriented inheritance language constructs; and (d) generating source code for a software component of an object-oriented programming system, said software component being adapted to send to said programming interface said data request for the content of said binary data record associated with said reference, and said software component being adapted to receive from said programming interface a response to said data request.

2. The method as claimed in claim 1 further comprising providing a published programming interface operable to connect with an interprocess communications mechanism to deliver said name component of said record layout and an architecture-specific binary data record to said software component wherein said programming interface allows communication in multiple programming languages.

3. The method as claimed in claim 1 wherein said determining step comprises parsing an architecture-specific program source code having a data element to create a language neutral representation of said data element and storing the result of the parsing in a persistent storage medium.

4. The method as claimed in claim 1 wherein said generating step further comprises dynamically invoking a compiler to convert said source code of said software component into a binary form.

5. The method as claimed in claim 4 further comprising loading said generated binary form into memory for use.

6. The method as claimed in claim 4 wherein said compiling is performed dynamically.

* * * * *